A. A. DOVE.
RESILIENT DRIVING MECHANISM FOR MOTOR CYCLES.
APPLICATION FILED FEB. 4, 1911.

1,028,335.

Patented June 4, 1912.

Witnesses.
E. R. Belard.
C. Severance.

Inventor.
Alfred A. Dove.
By Hazard Strauss
Attys.

UNITED STATES PATENT OFFICE.

ALFRED A. DOVE, OF LOS ANGELES, CALIFORNIA.

RESILIENT DRIVING MECHANISM FOR MOTOR-CYCLES.

1,028,335.  Specification of Letters Patent.  Patented June 4, 1912.

Application filed February 4, 1911. Serial No. 606,497.

*To all whom it may concern:*

Be it known that I, ALFRED A. DOVE, a citizen of the United States, residing at Los Angeles, in the county of Los Angeles and State of California, have invented new and useful Improvements in Resilient Driving Mechanism for Motor-Cycles, of which the following is a specification.

This invention relates to improvements in resilient driving mechanisms for vehicles and particularly for motorcycles or other motor vehicles and it is an object of the invention to provide a driving wheel of a motorcycle or vehicle with a resilient actuating means whereby the said wheel can be operated without the usual strain upon its parts.

It is a further object of the invention to provide a driving sprocket wheel for the driving wheel of a motor vehicle or motor cycle, which is so connected with the wheel as to distribute the strain evenly upon the rim or peripheral portion of the said wheel.

Figure 1:
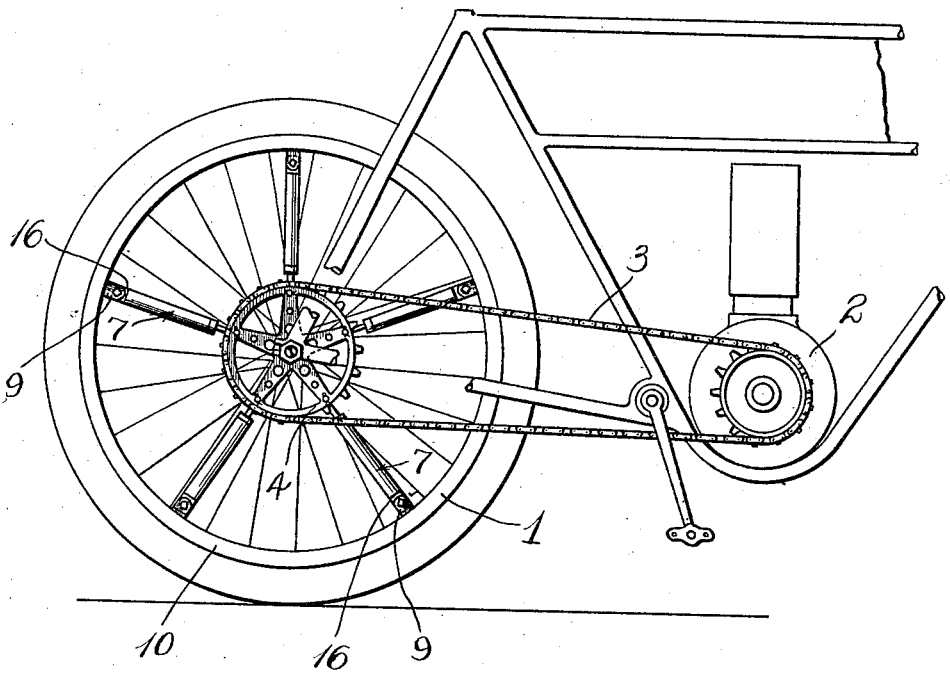
Figure 2:
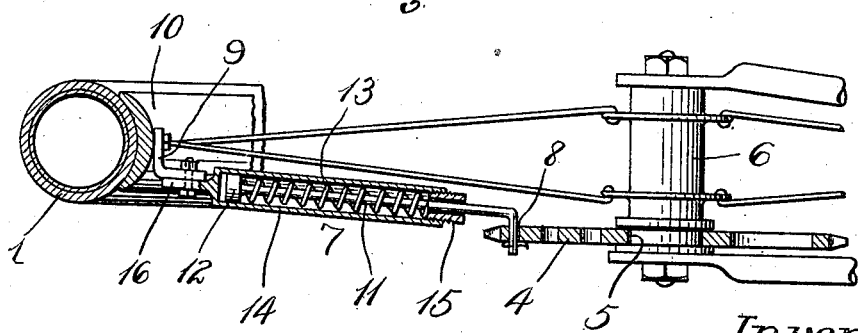

In the accompanying drawing forming a part of this specification, Figure 1 is a side elevation of a portion of a motor-cycle showing the improved resilient driving mechanism applied to the driving wheel thereof. Fig. 2 is a horizontal sectional view through a portion of the driving wheel and the resilient sprocket thereof, the section also being taken through one of the spring inclosing casings.

The parts of the invention will now be particularly described, reference being had to the drawing illustrating the same. In the said drawing, 1 is a drive wheel of a motor-cycle, 2 an engine connected therewith, and 3 a sprocket chain connecting the sprocket of the engine with the sprocket of the drive wheel 1. The sprocket 4 for the drive wheel is made of the usual shape and size but is provided with a loose bearing as 5 upon the hub 6 of the driving wheel 1. The said sprocket may have a proper engagement with the hub by limiting its movement thereon between guiding flanges or in any other desired or suitable way. In order that the sprocket wheel 4 may communicate its movement to the drive wheel 1, it is connected with the periphery of said drive wheel at intervals by resilient means.

As illustrated in the drawing, the resilient means comprises spring members as 7 which are pivotally connected at 8 with apertures or bearings formed in the sprocket wheel. At their outer ends the said resilient members are pivotally connected with brackets 9 which are firmly secured to the rim 10 of the wheel. While the spring member itself may be of any desired construction and may merely embrace an ordinary coiled spring, connected at its ends with the sprocket and rim, I usually form the spring member of a rod as 11 having a head 12 adapted to retain a coiled spring 13 in position thereon. The said rod projects into a casing as 14 and has telescoping connection therein, the outer end of the casing being closed by a sleeve or ring nut as 15 against which one end of the spring 13 bears. The opposite end of the casing 14 is provided with a projection 16 by which it is pivotally secured to the bracket 9. The pull upon the sprocket wheel by the engine tends to rotate the said wheel upon the hub 6 and pulls the plunger 11 with its head 12 against the spring 13. The spring will yield at first slightly but will gradually bring the wheel up to the movement of the sprocket and any uneven pull or action on the part of the engine will be compensated for by the action of the springs.

In applying the device to the drive wheel as many springs are used around the periphery thereof as are found desirable or convenient. As shown in the drawing, five spring devices are usually employed to advantage. The pull upon the sprocket wheel is thus distributed evenly to the rim of the wheel at various points upon its periphery. The strain ordinarily taken by the spokes of the wheel is thus entirely transmitted to the felly or rim portion of the wheel and the action of the driving mechanism is found to place much less rack and strain upon the wheel than when the sprocket is connected rigidly with the hub thereof. The parts of the mechanism and of the wheel can also be made lighter than where the sprocket is fastened to the hub.

What I claim is:—

A resilient driving mechanism for vehicle wheels, comprising in combination with a rim and a hub, of a sprocket wheel loosely mounted upon said hub, plunger rods pivoted to said sprocket wheel, springs for exerting a tension upon said plunger rods, inclosing casings receiving said springs and the outer ends of said plunger rods, the said casings being pivotally connected with the said rim and forming abutments for the springs, and a protecting and guiding covering for said spring and plunger.

In witness that I claim the foregoing I have hereunto subscribed my name this 23rd day of January, 1911.

ALFRED A. DOVE.

Witnesses:
 EDITH STADTMAN,
 EARLE R. POLLARD.

Copies of this patent may be obtained for five cents each, by addressing the "Commissioner of Patents, Washington, D. C."